United States Patent Office 3,382,278
Patented May 7, 1968

3,382,278
4-PROPIOLOYLPHENOXY-ALKANOIC ACIDS
Everett M. Schultz, Ambler, and Norman P. Gould, Landsdale, Pa., assignors to Merck & Co., Inc., Rahway, N.J., a corporation of New Jersey
No Drawing. Filed Sept. 30, 1964, Ser. No. 400,577
6 Claims. (Cl. 260—521)

ABSTRACT OF THE DISCLOSURE 4-propioloylphenoxy-alkanoic acid products which are substituted in the propioloyl group by a lower alkyl, mononuclear aryl or mononuclear aralkyl radical. The products are diuretics and saluretics which can be used in the treatment of hypertension and other conditions associated with edema.

The method employed in preparing the instant products consists in oxidizing an appropriate 4-(1-hydroxy-2-propynyl)-phenoxy-alkanoic acid to its corresponding oxo analog. Suitable oxidizing agents which may be employed in the process include, for example, chromium trioxide in sulfuric acid, pyridine, methyl ethyl ketone or acetone, etc.

---

This invention relates to a new class of chemical compounds which can be described generally as 4-propioloylphenoxy-alkanoic acids and to a novel method for their preparation.

The alkanoic acids of the invention have the following structural formula:

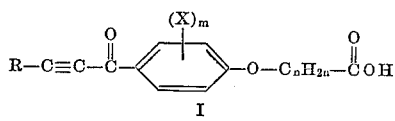

I wherein X is a member selected from the group consisting of hydrogen, halogen, lower alkyl, lower alkoxy and, taken together, two X radicals on adjacent carbon atoms of the benzene ring may be joined to form an hydrocarbylene chain (i.e., a divalent organic radical composed solely of carbon and hydrogen) containing four carbon atoms between their points of attachment, for example, tetramethylene, 1,3-butadienylene (i.e.,

—CH=CH—CH=CH—)

etc.; R is a member selected from the group consisting of hydrogen, lower alkyl, mononuclear aryl, for example,

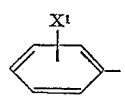

and mononuclear aralkyl, for example,

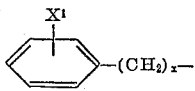

wherein the radical $X^1$ is a member selected from the group consisting of hydrogen and lower alkyl; and $x$ is an integer having a value of 1-2; $m$ is an integer having a value of 1-4; and $n$ is an integer having a value of 1-5.

Included within this invention are the acid addition salts of the alkanoic acids (I) which may be prepared by methods well-known to those skilled in the art; as, for example, by treating the foregoing acid products with a base having a non-toxic pharmacologically acceptable cation. In general, any base which will form an acid addition salt with the instant alkanoic acids (I) and whose pharmacological properties will not cause an adverse physiological effect when ingested by the body system is considered as being within the scope of this invention; suitable bases thus include, for example, the alkali metal and alkaline earth metal hydroxides, carbonates, etc., ammonia, primary, secondary and tertiary amines such as monoalkylamines, dialkylamines, trialkylamines, nitrogen containing heterocyclic amines, for example, piperidine, etc. The acid addition salts thus produced are the functional equivalent of the corresponding alkanoic acids (I) and one skilled in the art will appreciate that to the extent that the alkanoic acids of the invention are useful in therapy the variety of said acid addition salts is limited only by the criterion that the bases employed in forming the said salts be both non-toxic and physiologically acceptable.

This invention also relates to the ester and amide derivatives of the instant alkanoic acids (I), which are prepared by conventional methods well-known to those skilled in the art; thus, for example, the said ester derivatives may be prepared by the reaction of the alkanoic acid products of the invention with an alcohol as, for example, with a lower alkyl alcohol to prepare the corresponding esterified derivative or, alternatively, the alkanoic acid (I) may be converted to its acid halide by conventional means and then treated with the appropriate lower alkanol. Similarly, the amide derivatives of the instant alkanoic acids (I) may be prepared by treating an acid halide derivative of the alkanoic acids of the invention with ammonia or an appropriate amine to produce the corresponding amide. Another process for preparing the said amide derivatives comprises the conversion of the alkanoic acids (I) of the invention to their corresponding esters and treating the said esters with ammonia or an appropriate amine to produce the corresponding amide. These and other equivalent methods for the preparation of the ester and amide derivatives of the instant alkanoic acids (I) will be apparent to those having ordinary skill in the art and to the extent that the said derivatives are both non-toxic and physiologically acceptable to the body system, the said esters and amides are the functional equivalent of the corresponding alkanoic acid products (I).

In pharmacological studies the alkanoic acids (I) of this invention show a marked ability to effect an elimination of excess fluid and electrolyte from the body. Thus, when administered in therapeutic dosages, in conventional vehicles, the instant products effectively reduce the concentration of sodium and chloride ions in the body and lower dangerous excesses of body fluids to acceptable levels. This diuretic and saluretic activity of the instant compounds, therefore, makes them highly useful in the treatment of hypertension, congestive heart failure, kidney malfunctioning, cirrhosis of the liver and other diseases associated with edema.

A preferred embodiment of the invention relates to the 4-propioloylphenoxy-alkanoic acids of the following formula:

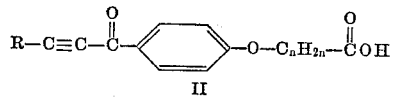

II wherein R is a member selected from the group consisting of lower alkyl and phenyl; and $n$ is an integer having a value of 1–3. The above class of compounds exhibits particularly good diuretic activity and represents a preferred subgroup of compounds within the scope of this invention.

The alkanoic acids (I) of the invention are conveniently prepared by methods which involve the oxidation of an appropriately substituted hydroxy derivative, such as a 4-(1-hydroxy-2-propynyl)phenoxy-alkanoic acid (III, infra), to the corresponding oxo analog. However, the instant process is not limited solely to the single stage oxidation of an hydroxy derivative (III) to the corresponding oxo product but relates, also, to the oxidation of a suitably substituted 4-(1-hydroxy-2 - propynyl)phenoxy - alkanol (IV, infra) wherein both the hydroxy group in the propynyl chain and the hydroxyl group in the alkanoyl chain are converted to their corresponding oxo and carboxy groups, respectively. The equations which follow illustrate these processes. Equation 1 depicts the single step oxidation of a 4-(1-hydroxy-2-propynyl)phenoxy-alkanoic acid (III) to its corresponding oxo derivative (I) and Equation 2 depicts the oxidation of a 4-(1-hydroxy-2-propynyl) phenoxy-alkanol (IV) to the same product (I).

1.
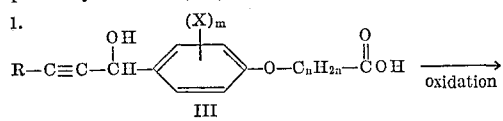

2.
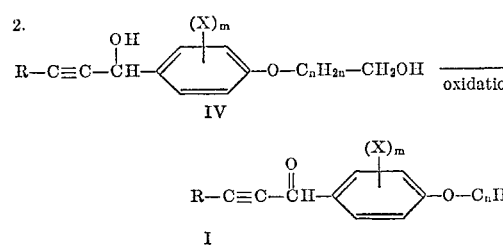

wherein X, R, $m$ and $n$ are as defined above.

Chromium trioxide in a mixture of sulfuric acid and water is a particularly suitable oxidizing agent for use in the foregoing oxidation reactions but it will be obvious to those skilled in the art that other, functionally equivalent, reagents may also be used in a similar manner to obtain the same results. Any oxidizing agent which is capable of converting the 4-(1-hydroxy-2-propynyl)phenoxy-alkanoic acid (III) and the 4-(1-hydroxy-2-propynyl)phenoxy-alkanol (IV) of Equations 1 and 2, supra, to the desired acid (I) is to be considered as being within the scope of this invention. Furthermore, the chromium trioxide oxidizing agent mentioned above may also be used in conjunction with diluents other than a sulfuric acid-water mixture. For example, pyridine, methyl ethyl ketone, acetone and other appropriate inert solvents may also be employed in combination with chromium trioxide to obtain the same conversion of starting materials III and IV to the desired acid (I).

Generally, it is most desirable to conduct the oxidation reaction at low temperatures as, for example, in the range of about —10° to about 0° C. but somewhat higher or lower temperatures may also be used with good results.

The 4-(1-hydroxy-2-propynyl)phenoxy - alkanoic acids (III) and 4-(1-hydroxy - 2 - propynyl)phenoxy - alkanols (IV) which are employed as starting materials in the above-described oxidation processes are prepared via the Grignard reaction. According to this method an appropriate ethynyl magnesium halide, prepared by the condensation of an alkyl magnesium bromide with a suitably substituted acetylene, is first condensed with a 4-formyl-phenoxy-alkanoic acid or 4-formyl-phenoxy-alkanol in tetrahydrofuran, refluxed, cooled, treated with a saturated solution of ammonium chloride and then treated with concentrated hydrochloric acid and the resulting solution extracted with ether and worked up in the conventional manner to yield the desired 4-(1-hydroxy-2-propynyl) phenoxy-alkanoic acid (III) or 4-(1-hydroxy-2-propynyl) phenoxy-alkanol (IV).

The (4-formylphenoxy)alkanoic acids and (4-formyl-phenoxy)alkanols which are employed as reactants in the aforementioned Grignard reaction are conveniently prepared by the reaction of a phenol, or an appropriately substituted phenol, with hydrogen cyanide and hydrogen chloride (gas) in the presence of anhydrous aluminum chloride. The reaction is generally conducted in an inert solvent as, for example, in benzene. Gatterman, Annalen; vol.: 357; p. 334. The 4-formylphenol thus produced is then reacted with an halo substituted alkanoic acid or halo substituted alkanol in an inert solvent such as glycol dimethyl ether (i.e., glyme) or diethylene glycol dimethyl ether (i.e., diglyme) and in the presence of a base to produce the corresponding (4-formylphenoxy)alkanoic acid or (4-formylphenoxy)alkanol derivative. Suitable basic reagents which may be used in the process include, for example, sodium hydride, sodium ethoxide, etc.

Another method for preparing the alkanoic acids (I) of the invention comprises treating a 4-propioloylphenol (V, infra) with an halo substituted alkanoic acid ester in the presence of a basic reagent as, for example, in the presence of sodium hydride, potassium carbonate, sodium ethoxide, sodium methoxide, etc.; followed by the saponification of the carboxylate intermediate thus formed to the desired alkanoic acid (I). Preferably, the reaction is conducted in the presence of an inert solvent such as glycol dimethyl ether, N,N-dimethylformamide, etc., but other, similarly inert, solvents might also be employed. The following equation illustrates the reaction:

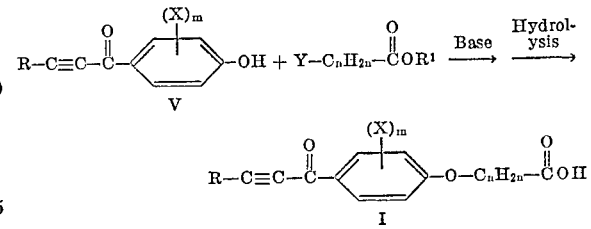

wherein X, R, $m$ and $n$ are as defined above, $R^1$ represents an hydrocarbyl group (i.e., a monovalent organic radical composed solely of carbon and hydrogen) such as lower alkyl, for example, methyl, ethyl, propyl, etc.; and Y is halogen, for example, bromine, chlorine, iodine, etc. Suitable bases which may be used in the process include, for example, sodium hydride in glyme, sodium ethoxide in ethanol and potassium carbonate in dimethylformamide, etc. The hydrolysis step in the above equation is conducted in a conventional manner as, for example, by treatment of the alkanoate intermediate with an acid, such as a mixture of hydrochloric acid in acetic acid, followed by dilution with water whereupon the desired product (I) separates out.

The 4-propioloylphenol (V) reactants of the above process are either known compounds or may be prepared by methods which are well-known to those having ordinary skill in the art. For example, a 4-formylphenol (VI) may be reacted with an ethynyl magnesium halide, prepared by the condensation of an alkyl magnesium halide (e.g., ethyl magnesium halide) with an appropriately substituted acetylene compound, and the 4-(1-hydroxy-2-propynylphenol) thus produced may be oxidized with chromium trioxide in a mixture of sulfuric acid and water to produce the desired 4-propioloylphenol (V). The following equation illustrates the process:

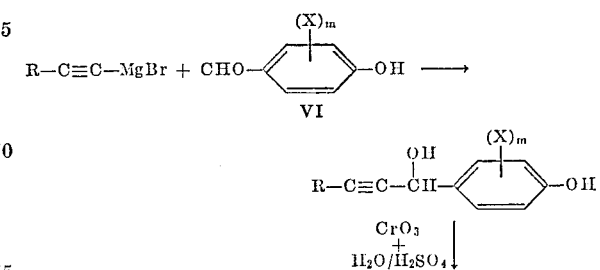

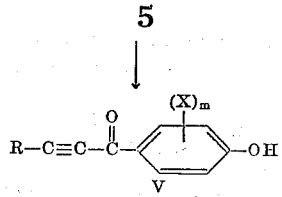

wherein R, X and m are as defined above. The reaction of the 4-formylphenol (VI) with the ethynyl magnesium halide reagent may be conducted in any suitably inert solvent as, for example, in tetrahydrofuran, ether, etc.

The alkanoic acids (I) of the invention are generally obtained as crystalline solids and, if desired, may be purified by recrystallization from a solvent. Suitable solvents include, for example, ethanol, a mixture of ethanol and water, benzene, ether, a mixture of ether and ligroin, etc.

The products of the invention are diuretic and saluretic agents and for this purpose can be administered in therapeutic dosages in conventional vehicles as, for example, by oral administration in the form of a tablet as well as by intravenous injection. Also, the dosage of the alkanoic acids (I) of the invention may be varied over a wide range and for this purpose scored tablets containing 25, 50, 100, 150, 250 and 500 milligrams of the active ingredient may be made available to the physician for the symptomatic adjustment of the dosage to the individual patient. These dosages are well below the toxic or lethal dose of the compounds (I).

The examples which follow illustrate the method of preparing the 4-propioloyl-phenoxy-alkanoic acids (I) of the invention. However, the examples are illustrative only and it will be apparent to one having ordinary skill in the art that all of the products embraced by Formula I, supra, may also be prepared in an analogous manner by substituting the appropriate starting materials for those set forth in the examples.

EXAMPLE 1.—4-PHENYLPROPIOLOYLPHENOXYACETIC ACID

Step A.—4-(1-hydroxy-3-phenyl-2-propynyl) phenoxyacetic acid

To magnesium turnings (3.65 g., 0.15 mole) and ether (20 ml.) there is added, under anhydrous conditions and in a nitrogen atmosphere, ethyl bromide (16.4 g., 0.15 mole) at such a rate that gentle refluxing is maintained. To the resulting solution of ethyl magnesium bromide, phenylacetylene (15.3 g., 0.15 mole) is added slowly. The mixture then is refluxed gently for one hour. To the resulting solution of phenylethynyl magnesium bromide there is added 100 ml. of tetrahydrofuran followed by the slow addition of a solution of 4-formylphenoxyacetic acid (9.0 g., 0.05 mole) in tetrahydrofuran (100 ml.). The mixture then is refluxed for 16 hours. After cooling in an ice bath, saturated ammonium chloride (100 ml.) is added and the mixture is acidified with concentrated hydrochloric acid. The mixture is extracted with ether and the ether extract is then extracted with a 10% sodium bicarbonate solution. The bicarbonate extract is washed with ether, acidified with concentrated hydrochloric acid and the oil that separates is extracted with ether. The extract is dried and evaporated at reduced pressure at 25° C. The residual oil, identified as 4-(1-hydroxy-3-phenyl-2-propynyl)phenoxyacetic acid, is used directly in the next step.

Step B.—4-phenylpropioloylphenoxyacetic acid

The 4 - (1 - hydroxy - 3 - phenyl - 2 - propynyl)phenoxyacetic acid (12.1 g.) is dissolved in acetone (65 ml.) and the solution is cooled to −10° C. To this mixture there is added, with stirring at −10° to 0° C., a solution of chromium trioxide (10 g.) in water (21.5 ml.) and concentrated sulfuric acid (7 ml.) over a period of 2½ hours. After stirring for an additional 1¼ hours the mixture is poured into cold water. The solid that separates is extracted with ether and the ether extract is dried and evaporated to obtain 8.8 g. of a crystalline solid, M.P. about 140° C. After repeated crystallizations from ethanol, ethanol-water and benzene, pure 4-phenylpropioloyl-phenoxyacetic acid, M.P. 157–158° C., is obtained.

Analysis for $C_{17}H_{12}O_4$.—Calculated: C, 72.85; H, 4.32. Found: C, 72.90; H, 4.61.

EXAMPLE 2.—4-BUTYLPROPIOLOYLPHENOXYACETIC ACID

Step A.—4-(1-hydroxy-2-heptynyl)phenoxyethanol

To an ether solution of ethyl magnesium bromide, prepared as described in Example 1 from magnesium (3.65 g., 0.15 mole) and ethyl bromide (16.4 g., 0.15 mole), there is added a solution of 1-hexyne (10.7 g., 0.13 mole) in tetrahydrofuran (75 ml.). The mixture is refluxed for four hours and then a solution of 4-formylphenoxyethanol (4.15 g.) in tetrahydrofuran (75 ml.) is added slowly. The mixture is refluxed for 16 hours, cooled and worked up as in Example 1 to obtain 6.15 g. of crude 4-(1-hydroxy-2-heptynyl)phenoxyethanol, which is used directly in the next step.

Step B.—4 butylpropioloylphenoxyacetic acid

To a solution of the 4-(1-hydroxy-2-heptynyl)phenoxyethanol (14.65 g.) in acetone (177 ml.) at −10° to 0° C. there is added slowly a solution of chromium trioxide (23.6 g.) in water (59 ml.) and concentrated sulfuric acid (20 ml.) as in Example 1, Step B. After maintaining the solution for two additional hours at 0° C., the mixture is poured into ice water, from which the product is then extracted with ether. The ether extract is washed with water and extracted with sodium bicarbonate. Upon acidification of the bicarbonate extract with hydrochloric acid 6.05 g. of solid separates. After crystallizing from ether-ligroin and from ether, pure 4-butylpropioloylphenoxyacetic acid, M.P. 117–117.5° C., is obtained.

Analysis for $C_{15}H_{16}O_4$.—Calculated: C, 69.21; H, 6.20. Found: C, 69.20; H, 6.17.

Either the process of Example 1 or the process of Example 2 may be used to prepare the instant products (I). Thus, by substituting the appropriate Grignard reagent and 4-formylphenoxy-alkanoic acid for the phenylethynyl magnesium bromide and 4-formylphenoxyacetic acid, respectively, of Example 1, Step A, and following substantially the procedure described in Steps A and B of that example, the corresponding 4-propioloylphenoxy-alkanoic acids (I) may be prepared. The following equation depicts the reaction of Example 1 and, together with Table I, illustrates the alkanoic acids (I) produced thereby.

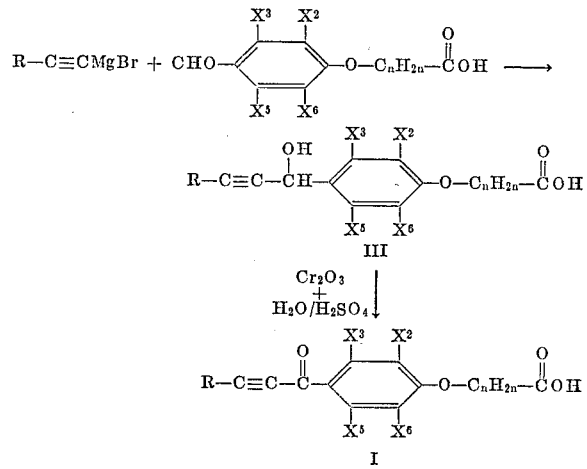

Alternatively, the alkanoic acid products (I) of the invention may be prepared by substituting the appropriate Grignard reagent and 4-formylphenoxy-alkanol for the 1-hexynyl magnesium bromide and 4-formylphenoxyethanol of Example 2, Step A, and following substantially the procedure described in Steps A and B of that example. The following equation depicts the reaction of Example 2 and Table I illustrates the products (I) produced thereby:

$$R-C\equiv CMgBr + CHO-\underset{X^5\ X^6}{\overset{X^3\ X^2}{\bigcirc}}-O-C_nH_{2n}-CH_2OH \longrightarrow$$

$$R-C\equiv C-\underset{}{\overset{OH}{\underset{|}{C}H}}-\underset{X^5\ X^6}{\overset{X^3\ X^2}{\bigcirc}}-O-C_nH_{2n}-CH_2OH$$

IV $$\downarrow \begin{array}{c} Cr_2O_3 \\ + \\ H_2O/H_2SO_4 \end{array}$$

$$R-C\equiv C-\overset{O}{\underset{\|}{C}}-\underset{X^5\ X^6}{\overset{X^3\ X^2}{\bigcirc}}-O-C_nH_{2n}-\overset{O}{\underset{\|}{C}}OH$$

I

TABLE I

| Ex. | —C$_n$H$_{2n}$— | R | X$^2$ | X$^3$ | X$^5$ | X$^6$ |
|---|---|---|---|---|---|---|
| 3 | —CH$_2$— | —CH$_3$ | H | Cl | H | H |
| 4 | —CH(CH$_3$)— | —C$_4$H$_9$ | H | —CH$_3$ | H | H |
| 5 | —CH$_2$— | —CH$_2$—⌬ | —CH$_3$ | —CH$_3$ | —CH$_3$ | H |
| 6 | —CH(CH$_3$)— | —⌬ | H | H | H | H |
| 7 | —C(CH$_3$)$_2$— | H | —CH$_3$ | —CH$_3$ | H | H |
| 8 | —CH$_2$— | —CH$_2$—CH$_2$—⌬ | —CH$_3$ | Cl | H | H |
| 9 | —CH$_2$— | —C$_4$H$_9$ | H | —OCH$_3$ | H | H |
| 10 | —CH(CH$_3$)— | —⌬ | —CH$_3$ | H | H | —CH$_3$ |
| 11 | —CH$_2$— | ⌬—CH$_3$ | —OCH$_3$ | H | H | H |
| 12 | —CH(C$_2$H$_5$)— | —CH$_3$ | —CH=CH—CH=CH— | | H | H |
| 13 | —CH$_2$— | —CH$_2$—CH$_2$—⌬ | H | H | H | H |
| 14 | —C(CH$_3$)$_2$— | H | —CH$_2$—CH$_2$—CH$_2$—CH$_2$— | | H | H |

It is apparent from the foregoing description that the 4-propioloylphenoxy-alkanoic acids (I) of the invention constitute a valuable class of compounds which have not been prepared heretofore. One skilled in the art will also appreciate that the processes disclosed in the above examples are merely illustrative and are capable of wide variation and modification without departing from the spirit of this invention.

What is claimed is:
1. A compound of the formula:

$$R-C\equiv C-\overset{O}{\underset{\|}{C}}-\overset{(X)_m}{\bigcirc}-O-C_nH_{2n}-\overset{O}{\underset{\|}{C}}OH$$

wherein X is a member selected from the group consisting of hydrogen, halogen, lower alkyl, lower alkoxy and, taken together, two X radicals on adjacent carbon atoms of the benzene ring may be joined to form an hydrocarbylene chain selected from the group consisting of tetramethylene and 1,3-butadienylene; R is a member selected from the group consisting of hydrogen, lower alkyl, $$\overset{X^1}{\bigcirc}- \quad \text{and} \quad \overset{X^1}{\bigcirc}-(CH_2)_x-$$

wherein X$^1$ is hydrogen or lower alkyl and $x$ is an integer having a value of 1–2; $m$ is an integer having a value of 1–4; and $n$ is an integer having a value of 1–5.

2. A compound of the formula:

$$R-C\equiv C-\overset{O}{\underset{\|}{C}}-\bigcirc-O-C_nH_{2n}-\overset{O}{\underset{\|}{C}}OH$$

wherein R is lower alkyl and $n$ is an integer having a valve of 1–3.

3. A compound of the formula:

$$\bigcirc-C\equiv C-\overset{O}{\underset{\|}{C}}-\bigcirc-O-C_nH_{2n}-\overset{O}{\underset{\|}{C}}OH$$

wherein $n$ is an integer having a value of 1–3.

4. 4-phenylpropioloylphenoxyacetic acid.
5. 4-butylpropioloylphenoxyacetic acid.
6. A compound of the formula:

$$R-C\equiv C-\overset{O}{\underset{\|}{C}}-\overset{(X)_m}{\bigcirc}-O-C_nH_{2n}-\overset{O}{\underset{\|}{C}}OH$$

wherein X is a member selected from the group consisting of hydrogen, halogen, lower alkyl, lower alkoxy and, taken together, two X radicals on adjacent carbon atoms of the benzene ring may be joined to form an hydrocarbylene chain containing four carbon atoms between their points of attachment; R is a member selected from the group consisting of hydrogen, lower alkyl, $$\overset{X^1}{\bigcirc}- \quad \text{and} \quad \overset{X^1}{\bigcirc}-(CH_2)_x-$$

wherein X$^1$ is hydrogen or lower alkyl and $x$ is an integer having a value of 1–2; $m$ is an integer having a value of 1–4; and $n$ is an integer having a value of 1–5; and the nontoxic, pharmacologically acceptable acid addition salts, lower alkyl esters and amide derivatives thereof.

References Cited

UNITED STATES PATENTS 3,010,996  3/1967  Litvan et al. _____ 260—559

OTHER REFERENCES

Wagner et al.: "Synthetic Organic Chemistry" (1963), pp. 419–420, 323–324.

HENRY R. JILES, *Primary Examiner.*

S. WILLIAMS, D. E. STENZEL, *Assistant Examiners.*